United States Patent
Wreschner et al.

(10) Patent No.: US 6,701,127 B1
(45) Date of Patent: Mar. 2, 2004

(54) BURST COMMUNICATIONS METHOD AND APPARATUS

(75) Inventors: Kenneth Solomon Wreschner, Chandler, AZ (US); Eric Jay Clelland, Tempe, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/464,975

(22) Filed: Dec. 16, 1999

(51) Int. Cl.[7] .................................................. H04B 7/19
(52) U.S. Cl. .................... 455/13.2; 455/13.1; 455/12.1; 455/427; 455/456
(58) Field of Search .......................... 455/456.1, 427, 455/13.1, 13.2, 12.1; 342/357.01–357.09

(56) References Cited

U.S. PATENT DOCUMENTS

| | | | |
|---|---|---|---|
| 4,292,683 A | | 9/1981 | Jueneman .................... 370/104 |
| 5,119,504 A | * | 6/1992 | Durboraw, III ............. 455/54.1 |
| 5,428,358 A | | 6/1995 | Gardner ....................... 342/26 |
| 5,463,400 A | * | 10/1995 | Tayloe ......................... 342/352 |
| 5,629,929 A | | 5/1997 | Blanchard et al. ........... 370/201 |
| 5,644,572 A | | 7/1997 | Olds et al. |
| 5,666,122 A | | 9/1997 | Carter ......................... 342/357 |
| 5,703,595 A | * | 12/1997 | Tayloe et al. ................ 342/175 |
| 5,710,765 A | | 1/1998 | Lee et al. .................... 370/321 |
| 5,764,690 A | | 6/1998 | Blanchard et al. .......... 375/206 |
| 5,828,336 A | | 10/1998 | Yunck et al. |
| 5,862,132 A | | 1/1999 | Blanchard et al. .......... 370/342 |
| 6,112,054 A | * | 8/2000 | Kita ........................... 455/12.1 |
| 6,122,291 A | * | 9/2000 | Robinson et al. ............ 370/468 |
| 6,169,958 B1 | * | 1/2001 | Nagasamy et al. .......... 701/213 |
| 2002/0094781 A1 | * | 7/2002 | Wreschner et al. ........... 455/63 |

FOREIGN PATENT DOCUMENTS

WO    WO 98/15070    4/1998

* cited by examiner

Primary Examiner—Vivian Chin
Assistant Examiner—Tuan Tran
(74) Attorney, Agent, or Firm—Jenner & Block LLP

(57) ABSTRACT

A transmitter (400) offsets the transmission time and frequency of a burst transmission such that uncertainties in reception time and reception frequency are reduced. The transmitter includes an ephemeris store (454) that includes ephemeris data for one or more possible intended receivers (130). Orbits of possible intended receivers are propagated, and an intended receiver is selected. Transmission time offsets are generated as a function of transmitter location and intended receiver location. Transmission frequency offsets are substantially equal to a Doppler frequency derived from the transmitter velocity and the intended receiver velocity. Guard times and guard bands are reduced in size, resulting in greater available communications bandwidth and simpler receiver designs.

14 Claims, 4 Drawing Sheets ized in real time to track and/or communicate with intended receiver 130.

BURST COMMUNICATIONS METHOD AND APPARATUS

FIELD OF THE INVENTION

The present invention relates generally to burst communications systems and, in particular, to burst communications systems having guard times and guard bands.

BACKGROUND OF THE INVENTION

Burst communications systems typically employ multiple transmitters that send "bursts" of transmissions to a receiver. Bursts from the different transmitters are coordinated in time and frequency such that each of the transmitters can communicate with the receiver without interfering with each other.

Receivers for use in burst communications systems can be complex, in part because receivers re-acquire burst transmissions each time they are transmitted. The re-acquisition can be more complex when burst communications systems use signals having low probability of detection (LPD) and low probability of interception (LPI), such as direct sequence spread spectrum (DSSS) signals.

Additional complications arise when the transmitter and receiver are moving relative to each other, as is the case in satellite systems. When a burst communications transmitter is on or near the earth, and the intended receiver is in a satellite, the spatial locations and the relative velocities of the transmitter and receiver change over time. The change in spatial location causes the propagation path length and the signal propagation time to change, and the change in relative velocities causes a Doppler frequency to change the frequency of the burst signal when it is received at the intended receiver.

Receivers in burst communications systems typically have "guard times" surrounding the expected arrival time of a burst communication. As the propagation path length changes, the burst communications signal occupies portions of the guard time, and the receiver typically includes additional complexity that allows the acquisition of the signal during the guard times. Moreover, these guard times and guard bands can also reduce the effective communications bandwidth. Receivers also typically have "guard bands" in frequency that surround the expected arrival frequency of the burst communication. As the relative velocities between the transmitter and receiver change, portions of the guard bands can be occupied by the received burst communications signal, due to the Doppler frequency shift.

Burst communications receivers include additional complexity when they are able to acquire signals in guard bands and during guard times. It would be desirable for guard times and guard bands to be reduced in burst communications systems.

Accordingly, a significant need exists for a method and apparatus for reducing guard times and guard bands in burst communications systems.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and wherein:

DETAILED DESCRIPTION OF THE DRAWINGS

In the following detailed description, reference is made to the accompanying drawings that show, by way of illustration, specific embodiments in which the invention may be practiced. It is to be understood that other embodiments may be utilized and structural changes may be made without departing from the scope of the present invention.

The method and apparatus of the present invention provide a mechanism for reducing signal uncertainties at an intended receiver. A burst transmitter computes the spatial location and velocity of an intended receiver. The transmitter also computes the spatial location and velocity of itself. The difference in spatial locations yields a path length that corresponds to a signal transit time, and the relative difference in velocities yields a Doppler frequency that a transmitted signal will experience at the receiver. The burst transmitter offsets the transmission time and transmission frequency to substantially compensate for the signal transit time and Doppler frequency such that uncertainties in arrival time and arrival frequency are reduced. As a result of the reduction in uncertainties, burst receiver complexity is reduced, and the robustness of the burst communications link increases.

Figure 1:
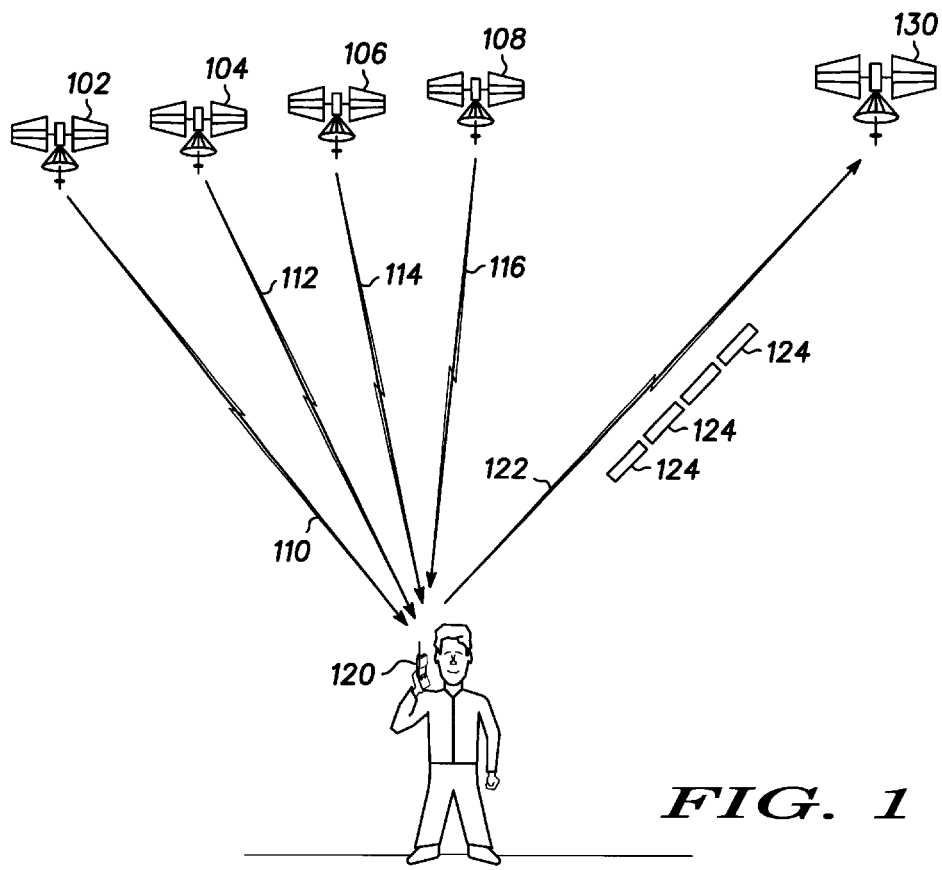
FIG. 1 shows a burst communications system in accordance with a preferred embodiment of the present invention.

Turning now to the drawings in which like reference characters indicate corresponding elements throughout the several views, attention is first directed to FIG. 1. FIG. 1 shows a burst communications system in accordance with a preferred embodiment of the present invention. Burst communications system 100 includes transmitter 120 and intended receiver 130. Transmitter 120 transmits bursts 124 using burst communications signals 124 along propagation path 122. Bursts 124 are separated by varying amounts of time. For example, in some embodiments bursts 124 are separated by hours or days. Search-and-rescue radios are an exemplary embodiment in which bursts 124 can be separated by great amounts of time. Search-and-rescue radios typically transmit one or more short bursts and then remain quiet for long periods to reduce the probability of detection.

Transmitter 120 can be a handheld unit, such as the embodiment shown in FIG. 1, and it can also be a fixed unit, or a transmitter affixed to an asset such as a truck, plane, or package. When transmitter 120 is affixed to an asset such as a truck, plane, or package, the method and apparatus of the present invention can help to track the asset.

Intended receiver 130 can be a receiver on any type of platform, such as an airplane or ship, but in a preferred embodiment of the present invention, intended receiver 130 is a satellite orbiting the earth. Intended receiver 130 can be a geosynchronous (GEO) satellite, medium earth orbit (MEO) satellite, lower earth orbit (LEO) satellite, or any other satellite capable of communicating with transmitter 120. In a preferred embodiment, intended receiver 130 is a LEO satellite that is part of a constellation of LEO satellites.

Propagation path 122 can vary greatly in length. For example, when intended receiver 130 is a LEO satellite that passes directly over transmitter 120, propagation path 122 is much longer when intended receiver 130 is on the horizon than when intended receiver 130 is directly overhead. As a result, signal transit time along propagation path 122 also varies. When intended receiver 130 is directly overhead, the signal transit time is shorter than when intended receiver 130 is on the horizon. Variations in signal transit time can result in variations in arrival time at intended receiver 130. For example, if transmitter 120 transmits burst signals 124 at predetermined times, intended receiver 130 can receive burst transmissions 124 offset by various amounts of time, where the offset is a function of the variation in length of propagation path 122.

In addition to variations in signal transit time, as receiver 130 moves relative to transmitter 120, variations exist in the received frequency as a result of Doppler frequency shift. Doppler frequency shift is a well-known phenomenon caused by the velocity of a transmitter with respect to a receiver. When intended receiver 130 is a LEO satellite, the Doppler frequency shift can be significant, and it can also change quickly over time as the satellite passes overhead. For example, in some embodiments, LEO satellites have any stationary point on the surface of the earth within their field of view for approximately nine minutes. Within this nine minutes, Doppler frequency shift goes from a maximum value to zero and then to the opposite maximum value.

As previously described, as the length of propagation path 122 changes, the received burst communications signal at intended receiver 130 includes uncertainties in time and frequency. To allow for proper operation with time of arrival uncertainties, guard times are typically employed. Guard times are dead times between transmitted burst communications. They are purposely inserted such that, when taking into account time of arrival uncertainties at an intended receiver, burst communications signals from multiple transmitters 120 do not overlap. The addition of guard times in burst communications systems consumes bandwidth resources that could otherwise be used for additional communication. Guard times are described further with reference to FIG. 2.

To allow for proper operation in the presence of Doppler frequency shift on received signals at intended receiver 130, frequency guard bands are typically inserted in the frequency domain to protect against adjacent frequency channels interfering with each other. Guard bands are described further with reference to FIG. 3 below.

The method and apparatus of the present invention apply pre-corrections to the transmitted burst signals such that they arrive at intended receiver 130 with less uncertainty in time and frequency. By providing for less uncertainty at intended receiver 130, guard times and guard bands can be reduced in size, thereby increasing available communications bandwidth, and decreasing the complexity of intended receiver 130.

Transmitter 120 determines its own location and velocity, and it also determines the location and velocity of intended receiver 130. Transmitter 120 determines the length of propagation path 122, and it also determines the transit time of signals propagating on propagation path 122. Transmitter 120 also determines the relative velocity of intended receiver 130 with respect to transmitter 120. From the relative velocity, transmitter 120 determines the Doppler frequency that will be experienced at intended receiver 130. Transmitter 120 alters the actual time of transmission and the transmission frequency such that when the signal is subjected to the transit time of propagation path 122 and the Doppler shift resulting from the relative velocity, the burst transmissions arrive at intended receiver 130 with less uncertainty.

In a preferred embodiment, transmitter 120 determines its own spatial location and velocity utilizing global positioning system (GPS) satellites. FIG. 1 shows GPS satellites 102, 104, 106, and 108. Transmitter 120 receives GPS signals 110, 112, 114, and 116 from GPS satellites 102, 104, 106, and 108 respectively.

Figure 2:
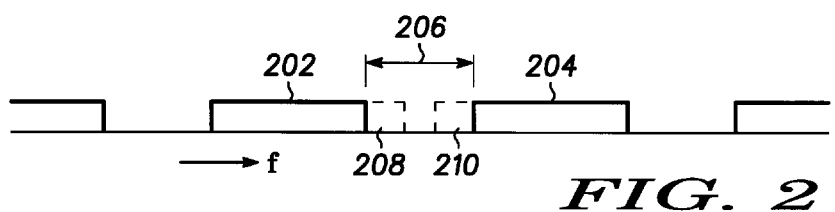
FIG. 2 shows guard times in a burst communications system in accordance with a preferred embodiment of the present invention.

FIG. 2 shows guard times in a burst communications system in accordance with a preferred embodiment of the present invention. Burst transmissions 202 and 204 are shown having a guard time 206 therebetween. In some embodiments, burst transmissions 202 and 204 are from different transmitters. The different transmitters can be located such that their propagation paths are very different. When burst transmissions 202 and 204 are each transmitted at times specified at the transmitters, the times of reception may cause burst transmissions 202 and 204 to encroach on guard time 206. Guard time 206 is typically sized such that when burst transmission 202 undergoes the largest possible transit delay and burst transmission 204 undergoes the least possible transit delay, the burst transmissions do not overlap.

The method and apparatus of the present invention vary the time of transmission at each transmitter such that each burst transmission is received at the intended receiver with greater certainty and with less encroachment on guard time 206. As a result, burst transmission 202 and 204 can be increased in size, and guard time 206 can be decreased in size. As shown in FIG. 2, burst transmission 202 can be increased in size as shown at 208, and burst transmission 204 can be increased in size as shown at 210.

Figure 3:
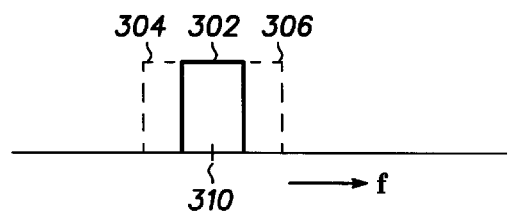
FIG. 3 shows guard bands in a burst communications system in accordance with a preferred embodiment of the present invention.

FIG. 3 shows guard bands in a burst communications system in accordance with a preferred embodiment of the present invention. Burst transmission 302 is shown centered at frequency 310. When the transmitter transmits at frequency 310, and the burst transmission undergoes a Doppler frequency shift, burst transmission 302 can occupy frequency spectrum 304 or frequency spectrum 306. When channels are adjacent to frequency 310, they are spaced sufficiently in frequency such that when burst transmission 302 undergoes a Doppler frequency shift, it does not interfere with an adjacent frequency channel.

The method and apparatus of the present invention pre-correct for Doppler frequency shift at the transmitter such that burst transmission 302 is received substantially at frequency 310 after undergoing any Doppler shift that is present. As a result, frequency spectrum 304 and frequency spectrum 306 can be utilized for communications rather than be reserved for use as guard bands.

Figure 4:
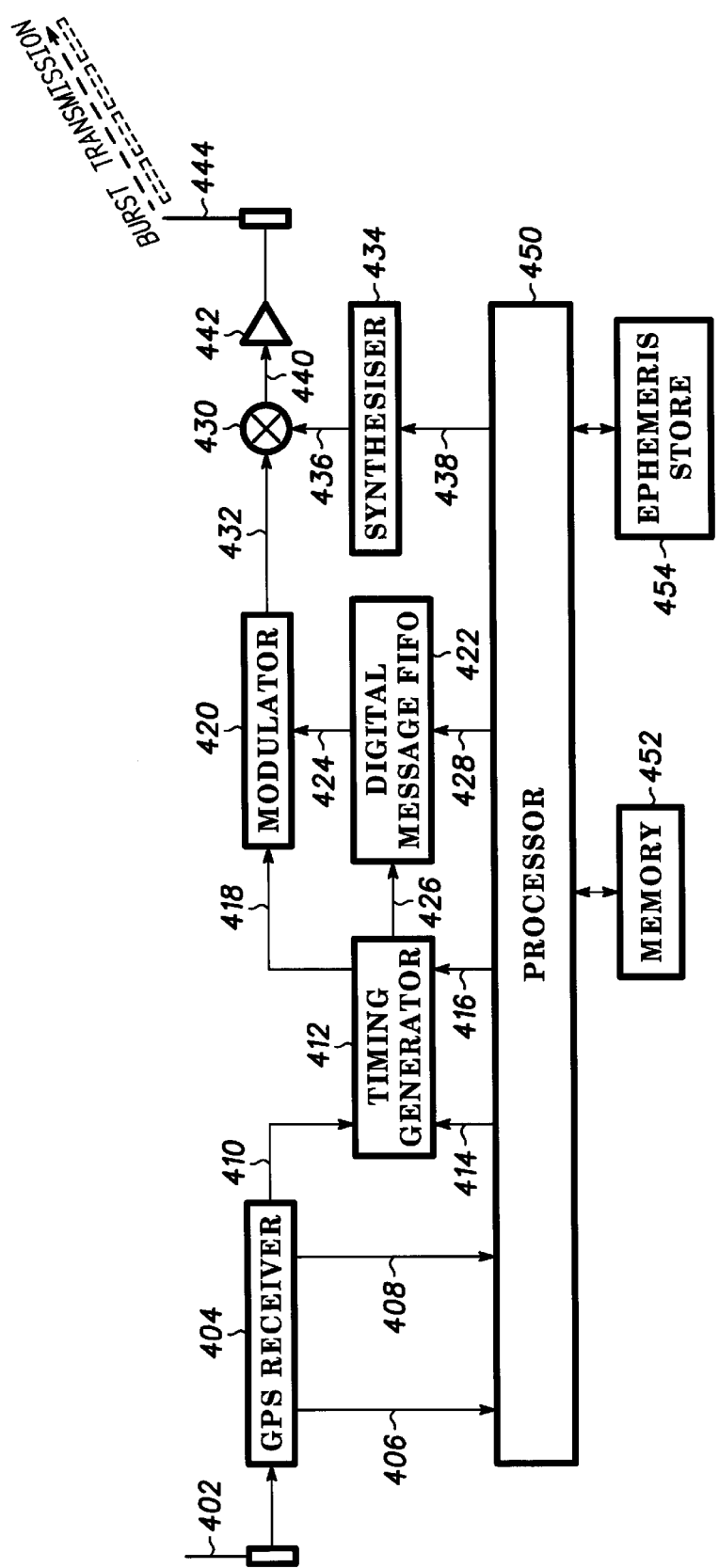
FIG. 4 shows a transmitter in accordance with a preferred embodiment of the present invention.

FIG. 4 shows a transmitter in accordance with a preferred embodiment of the present invention. Transmitter 400 includes GPS receiver 404, timing generator 412, digital message first-in-first-out (FIFO) buffer 422, modulator 420, synthesizer 434, mixer 430, amplifier 442, and antenna 444. Transmitter 400 further includes processor 450, memory 452, and ephemeris store 454.

Transmitter 400 transmits burst transmissions from antenna 444. Prior to transmission, the burst transmissions are offset in time and frequency such that an intended receiver receives the burst transmissions with reduced uncertainties in time and frequency. Transmitter 400 can be implemented in a communications system in which transmitter 400 is the only transmitter; however, in a preferred embodiment, transmitter 400 is one of many burst transmitters sharing spectrum and time slots while communicating with the intended receiver.

Transmitter 400 determines the spatial location and velocity of itself as well as the spatial location and velocity of the intended receiver. A time offset is derived from the difference of the spatial location of transmitter 400 and the spatial location of the intended receiver. A frequency offset is derived from the relative velocity of the intended receiver with respect to transmitter 400. Effects due to atmospheric phenomena can also be reduced through time and frequency offsets derived from estimates of the total electron content (TEC) along the line of sight between the transmitter and the intended receiver.

GPS receiver 404 is an autonomous location unit capable of providing location information to transmitter 404. GPS receiver 404 can be any type of autonomous location unit capable of providing location information while still practicing the present invention. GPS receiver 404 receives signals from GPS satellites and provides transmitter location, velocity, and time to processor 450. GPS receiver 404 also provides a time reference on node 410 to timing generator 412. The time reference is derived from the GPS data such that all transmitters in the system can have timing generators that operate from the same time reference. GPS receiver 404 also provides GPS navigation data to processor 450 on node 408. GPS navigation data includes information regarding atmospheric conditions in the line-of-sight between GPS receiver 404 and one or more GPS satellites. For example, GPS navigation data includes information useful to compute the total electron content (TEC).

Processor 450 is also coupled to memory 452 and ephemeris store 454. Memory 452 can be any type of memory capable of storing data or program information. Processor 450 can execute programs from memory 452 and can also store data in memory 452. Ephemeris store 454 includes ephemeris data for intended receivers. When intended receivers are satellites, ephemeris store 454 includes ephemeris data describing the orbits of the satellites. In some embodiments, a single satellite is available as an intended receiver, and ephemeris store 454 includes ephemeris data for the single satellite. In other embodiments, multiple satellites exist, any one of which can be the intended receiver, and ephemeris store 454 includes ephemeris data for the multiple satellites.

Processor 450 provides a modulation rate to timing generator on node 414, and it provides a transmit time to timing generator on node 416. Processor 450 further provides a transmit message to FIFO 422 on node 428 and provides a transmit frequency word on node 438 to synthesizer 434. Nodes 406, 408, 414, 416, 428, and 438 can be separate nodes as shown in FIG. 4, or they can be a shared node such as a processor bus. In some embodiments, processor 450 is a microprocessor, digital signal processor, microcontroller, or the like. In other embodiments, processor 450 is implemented in dedicated hardware such as a state machine. One skilled in the art will understand that any combination of processor and dedicated hardware can be substituted for processor 450 without departing from the scope of the present invention.

In a preferred embodiment, processor 450 calculates the orbits of intended receivers using ephemeris data included within ephemeris store 454. When calculating the orbits, processor 450 calculates the spatial location and velocity of intended receivers at a given time. For example, if a burst transmission is scheduled for one hour in the future, processor 450 can calculate the spatial location and velocity of an intended receiver one hour in the future. This is termed "propagating the orbit" or "propagating the ephemeris" of the intended receiver. In some embodiments, orbits are propagated just prior to transmission. In other embodiments, orbits are propagated hours, days, or further, in advance.

In a preferred embodiment, the intended receiver is selected from multiple satellites. Processor 450 propagates orbits of multiple satellites and stores the results in memory 452. A transmission time is selected for a future burst transmission 400, and processor 450 propagates the orbits to the future transmission time. The results of the propagation operation include the spatial location and velocity of multiple satellites at the future transmission time. In a preferred embodiment, transmitter 400 selects the intended receiver based on the spatial location as described by the propagated orbits in memory 452. In other embodiments, other criteria are used to select the intended receiver. For example, an intended receiver can be assigned to a transmitter or to a specific transmission. Also, for example, an intended receiver can be selected on a priority basis.

Ephemeris data included within ephemeris store 454 is preferably periodically updated, because as orbits degrade, ephemeris data can become "stale." Ephemeris data can be updated by a user, or by a connection to a network such as the Internet. Ephemeris data can also be updated by the intended receiver itself. For example, intended receiver 130 can transmit updated ephemeris data to transmitter 120 (FIG. 1).

In a preferred embodiment, processor 450 utilizes the information describing the spatial location of the transmitter and the information describing the spatial location of the intended receiver to determine the distance from the transmitter to the receiver. Processor 450 determines a signal transit time from the distance, and it offsets the transmit time on node 428. The transmit time on node 428 can be advanced or delayed; however, in a preferred embodiment, transmit time on node 428 is advanced by the signal transit time. By advancing the transmit time by the signal transit time, the time originally specified as the transmission time becomes the time at which the intended receiver receives the burst transmission. This is advantageous in part because guard times at the intended receiver can be reduced.

Processor 450 utilizes the information describing the velocity of the transmitter and the velocity of the intended receiver to determine a relative velocity between the transmitter and receiver. From the relative velocity, processor 450 determines a Doppler frequency shift. The mechanisms for determining relative velocity and Doppler frequency shift are well known and are not further described here. Processor 450 offsets the transmit frequency word by a frequency substantially equal to the Doppler frequency. As a result, synthesizer 434 produces a local oscillator signal on node 436 that is offset by the Doppler frequency.

When transmitter 400 transmits a burst communication, timing generator 412 starts the process at a time specified by a combination of the timing reference on node 410 and the transmit time on node 416. A transmit clock is provided to FIFO 422 on node 426, and a transmit enable signal is provided to modulator 420 on node 418. FIFO 422 sends a digital message on node 424 to modulator 420, and modulator 420 provides a modulated signal to mixer 430 on node 432. Mixer 430 converts the frequency of the modulated signal to a final radio frequency (RF), and it provides the final RF to amplifier 442 on node 440. Antenna 444 transmits the resulting burst communications signal.

Modulator 420 can perform any type of modulation. Examples include frequency shift keying (FSK) and phase shift keying (PSK). Modulator 420 can also utilize other techniques, such as direct sequence spread spectrum (DSSS) techniques. Each of the modulation techniques utilizes a modulation rate for transmitting digital data. For example, FSK and PSK have a symbol rate associated therewith, and DSSS utilizes a "chip rate" for applying a pseudo-random code to the signal to be transmitted. In one embodiment, the method and apparatus of the present invention also compensate for the effect of the Doppler frequency on the modulation rate. For example, processor 450 provides a modulation rate to timing generator on node 414. The modulation rate is compensated such that after the transmitted signal has undergone the effect of the Doppler shift, the modulation rate is the rate expected by the intended receiver.

Transmitter 400 is advantageous in part because the burst transmission emanating therefrom arrives at an intended receiver at a time that is referenced to the intended receiver's frame of reference. Guard times at the receiver can, as a result, be reduced in size, or "restricted," and communications bandwidth can be increased. Transmitter 400 is also advantageous in part because the burst transmission is received at an intended receiver with less frequency uncertainty, and as a result, the intended receiver can be less complex.

Figure 5:
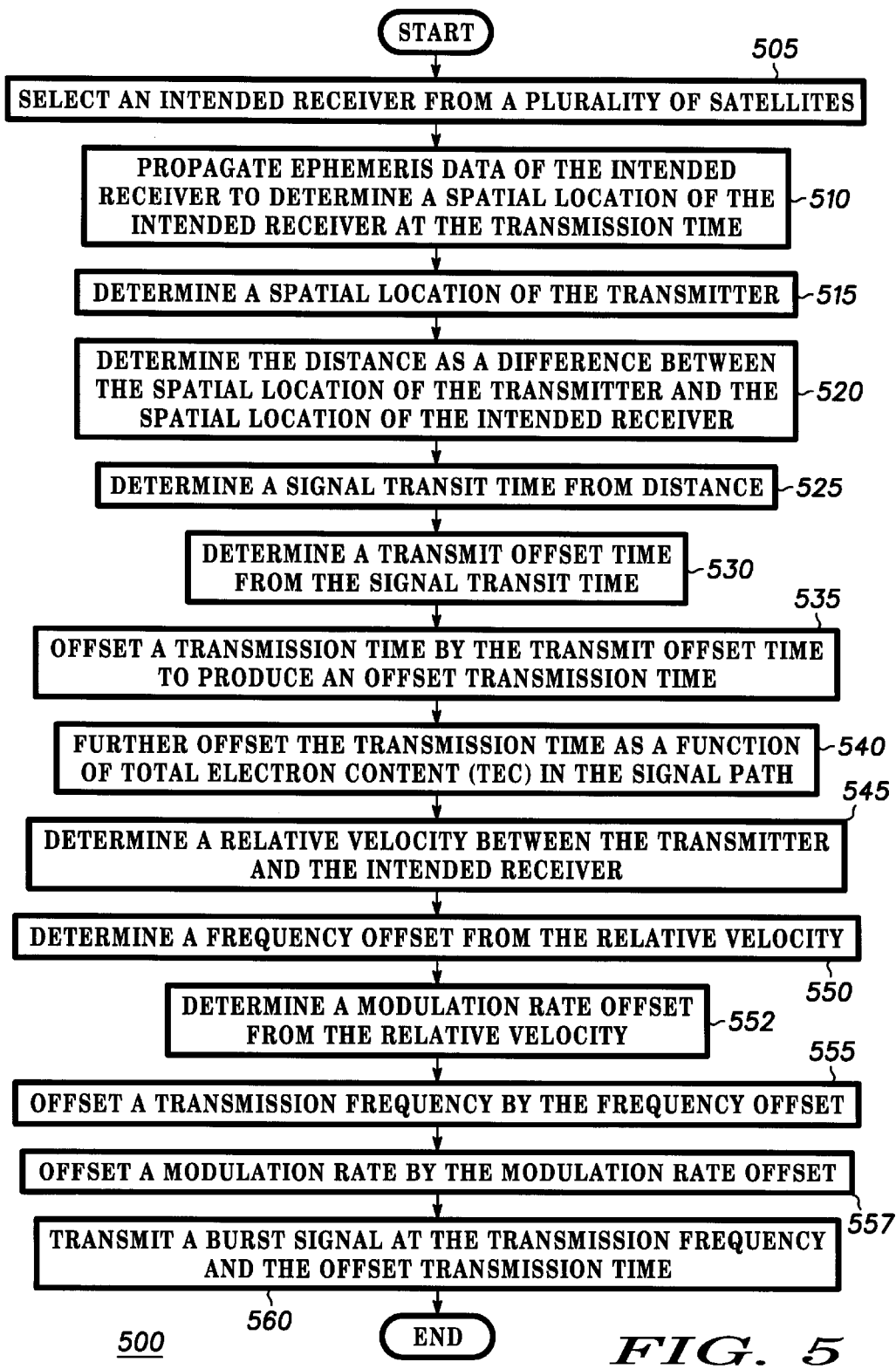
FIG. 5 is a flowchart of a method for reducing received signal uncertainties at an intended receiver in accordance with a preferred embodiment of the present invention.

FIG. 5 is a flowchart of a method for reducing received signal uncertainties at an intended receiver in accordance with a preferred embodiment of the present invention. Method 500 begins in block 505 when an intended receiver is selected from a plurality of satellites. The intended receiver can be selected using any criteria, such as proximity or priority. In block 510, ephemeris data of the intended receiver is propagated to determine a spatial location of the intended receiver at the transmission time. The propagation of ephemeris data can occur for a single intended receiver after the intended receiver is selected from a plurality of satellites as shown in the embodiment of FIG. 5, or the ephemeris data can be propagated for more than one intended receiver, and it can be propagated well in advance of selecting the intended receiver.

In block 515, a spatial location of the transmitter is determined. The spatial location of the transmitter can be determined using an autonomous location unit, such as GPS receiver 404 (FIG. 4). In block 520, the distance between the transmitter and the intended receiver is determined. The distance is determined as a difference between the spatial location of the intended receiver determined in block 510 and the spatial location of the transmitter determined in block 515.

In block 525, a signal transit time is determined from the distance between the transmitter and intended receiver. A transmit offset time is determined from the signal transit time in block 530. In block 535, the transmission time is offset by a transmit offset time to produce an offset transmission time. In block 540, the transmission time is further offset as a function of the estimated total electron content along the signal path. In another embodiment, the transmit frequency is also offset as a function of the estimated total electron content along the signal path. Total electronic content and variations in the total electron content as a function of time along the signal path can be determined from GPS navigation data provided by a GPS receiver, such as GPS receiver 404 (FIG. 4).

In a preferred embodiment that utilizes multiple GPS satellites, the GPS satellite with a spatial location closest to the intended receiver is used. The total electron content can then be computed by processor 450 utilizing either a single-frequency ionospheric correction model or a dual-frequency ionospheric correction model. The single-frequency ionospheric correction model can use the L1 (1575.42 MHz) band, and the dual-frequency ionospheric correction model can use the L1 and L2 (1227.6 MHz) band. For the single-frequency ionospheric correction model embodiment, the total electron content estimate uses the elevation angle from the transmitter to the intended receiver, the GPS time, and the received GPS navigation data to compute the transmit time and transmit frequency offsets as a function of the original transmit frequency.

In an alternate embodiment, transmitter 400 gathers statistics of estimated total electron content using multiple GPS satellites, and it also gathers statistics on the variations of total electron content. Transmitter 400 then uses statistical averages of these values to determine transmit time and transmit offsets.

The offset transmission time represents a time for transmitting a burst communication from a transmitter. When the burst communication is transmitted at the offset transmission time, the burst transmission arrives at the intended receiver with less time uncertainty. The intended receiver can receive burst communications signals from multiple transmitters that are different distances away, while receiving each with less time uncertainty.

In block 545, the relative velocity is determined between the transmitter and the intended receiver. The relative velocity can be determined as the difference in the intended receiver velocity and the transmitter velocity along a vector parallel to the transmission path between the transmitter and intended receiver. The velocity of the intended receiver can be determined from the propagated ephemeris data of block 510, and the velocity of the transmitter can be determined from an autonomous location unit, such as GPS receiver 404 (FIG. 4).

In block 550, a frequency offset is determined from the relative velocity. The frequency offset is substantially equal to the Doppler frequency that the burst transmission will be subjected to at the intended receiver. In block 552, the modulation rate offset is determined from the relative velocity. The modulation rate offset is substantially equal to the Doppler frequency that the burst transmission modulation rate will be subjected to at the intended receiver. In block 555, the transmission frequency is offset by the frequency offset, in block 557, the modulation rate is offset by the modulation rate offset, and in block 560, a burst signal is transmitted at the transmission frequency and at the offset transmission time.

Figure 6:
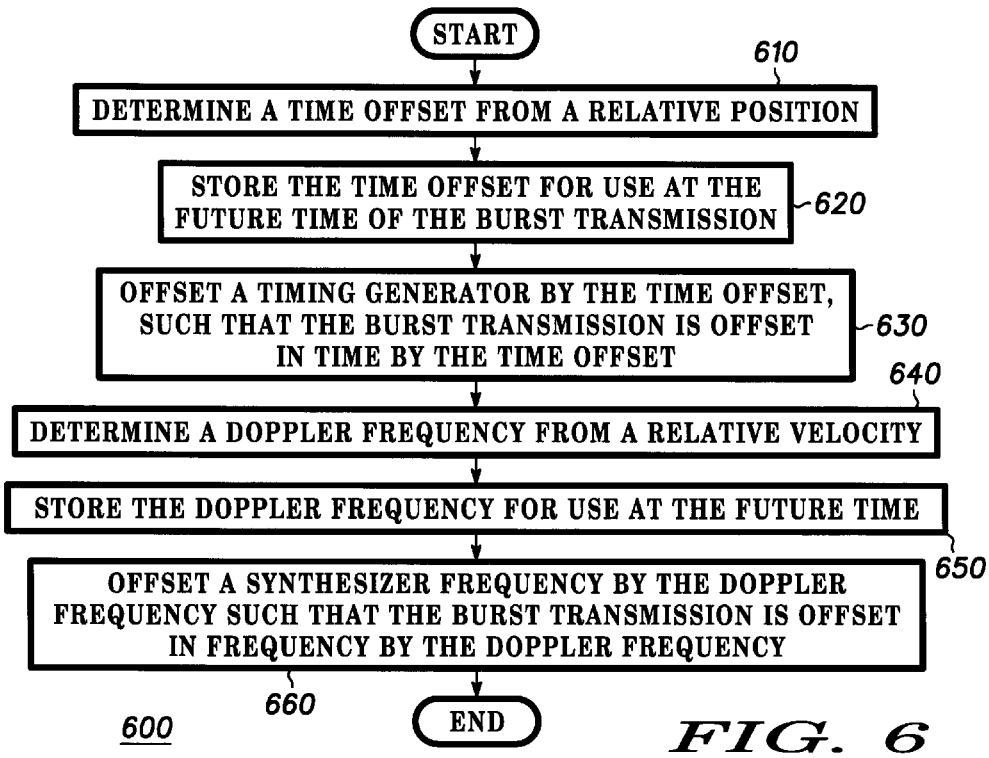
FIG. 6 is a flowchart of a method for reducing arrival time uncertainties and arrival frequency uncertainties of a burst transmission at an intended receiver in accordance with an alternate embodiment of the present invention.

FIG. 6 is a flowchart of a method for reducing arrival time uncertainties and arrival frequency uncertainties of a burst transmission at an intended receiver in accordance with an alternate embodiment of the present invention.

Method 600 begins in block 610 when a time offset is determined from a relative position. The relative position can be the spatial location of a transmitter relative to a spatial location of an intended receiver, such as transmitter 120 and intended receiver 130 (FIG. 1). In block 620, the time offset is stored for use at the future time of a burst transmission. The time offset can be stored in a memory such as memory 452 within transmitter 400 (FIG. 4).

In block 630, a timing generator is offset by the time offset, such that the burst transmission is offset in time by the time offset. The timing generator of block 630 is a timing generator within a transmitter, such as timing generator 412 (FIG. 4).

In block 640, a Doppler frequency is determined from a relative velocity. The relative velocity is a velocity difference between a transmitter and an intended receiver. The Doppler frequency is stored for use at the future time of the burst transmission in block 650.

In block 660, a synthesizer frequency is offset by the Doppler frequency such that the burst transmission is offset in frequency by the Doppler frequency.

Referring now to FIG. 4, in one embodiment, method 600 corresponds to offsetting the transmit time on node 416 and the transmit frequency word on node 438. By pre-correcting for transit delay and Doppler frequency shift, timing and frequency uncertainties can be reduced at the intended receiver.

Figure 7:
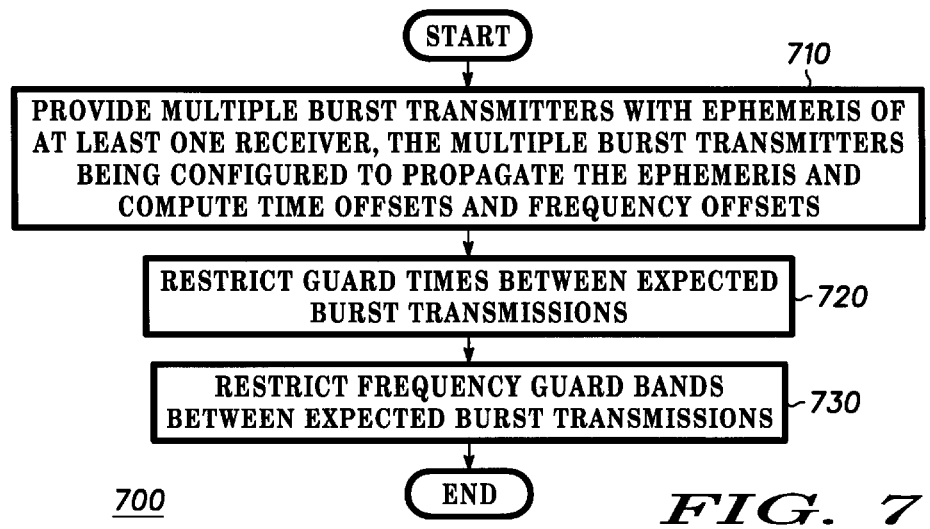
FIG. 7 is a flowchart of a method for controlling received signal characteristics in accordance with a preferred embodiment of the present invention.

FIG. 7 is a flowchart of a method for controlling received signal characteristics in accordance with a preferred embodiment of the present invention. Method 700 begins in block 710 when multiple burst transmitters are provided with ephemeris data of at least one receiver. The multiple burst transmitters are configured to propagate the ephemeris and to compute time offsets and frequency offsets. In block 720, guard times between expected burst transmissions are restricted, and in block 730, frequency guard bands between expected burst transmissions are restricted. Providing burst transmitters with ephemeris data allows the multiple burst transmitters to calculate time and frequency offsets as a function of intended receiver spatial location and velocity, thereby allowing the reduction in guard times and guard bands.

In summary, the method and apparatus of the present invention provide a mechanism for reducing uncertainties in signal characteristics at an intended receiver. While we have shown and described specific embodiments of the present invention, further modifications and improvements will occur to those skilled in the art. For example, while the method and apparatus of the present invention have been described with reference to burst transmission systems, the method and apparatus of the present invention also apply to other applications for offsetting signal characteristics prior to transmission. For example, in some embodiments of the present invention, time offsets and frequency offsets are applied to signals in constant communication with receivers. We desire it to be understood, therefore, that this invention is not limited to the particular forms shown and we intend in the appended claims to cover all modifications that do not depart from the spirit and scope of this invention.

What is claimed is:

1. In a transmitter, a method of reducing received signal uncertainties at an intended receiver, the method comprising:

determining a distance from the transmitter to the intended receiver without receiving a communication from the intended receiver;

determining a signal transit time from the distance;

determining a transmit offset time from the signal transit time; and offsetting a transmission time by the transmit offset time to produce an offset transmission time.

2. The method of claim 1 further comprising transmitting a burst transmission at the offset transmission time.

3. The method of claim 1 wherein the intended receiver is a satellite, and determining a distance to the intended receiver comprises:

propagating ephemeris data of the intended receiver to determine a spatial location of the intended receiver at the transmission time;

determining a spatial location of the transmitter; and determining the distance as a difference between the spatial location of the transmitter and the spatial location of the intended receiver.

4. The method of claim 3 wherein the intended receiver is one of a plurality of satellites, the method further comprising prior to determining the distance, selecting the intended receiver from the plurality of satellites.

5. The method of claim 1 further comprising:

determining a relative velocity between the transmitter and the intended receiver;

determining a frequency offset from the relative velocity; and offsetting a transmission frequency by the frequency offset.

6. The method of claim 5 wherein the step of determining a relative velocity comprises determining a relative velocity between the transmitter and the intended receiver without receiving a communication from the intended receiver.

7. The method of claim 1 further comprising:

determining a relative velocity between the transmitter and the intended receiver;

determining a modulation rate offset from the relative velocity; and offsetting a modulation rate by the modulation rate offset.

8. The method of claim 7 wherein the step of determining a relative velocity comprises determining a relative velocity between the transmitter and the intended receiver without receiving a communication from the intended receiver.

9. The method of claim 1 wherein a signal path exists between the transmitter and the intended receiver, the method further comprising:

further offsetting the transmission time as a function of total electron content (TEC) in the signal path.

10. In a transmitter, a method of reducing arrival time uncertainties and arrival frequency uncertainties of a burst transmission at an intended receiver comprising:

determining a time offset from a relative position determined without receiving a communication from the intended receiver;

offsetting a timing generator by the time offset, such that the burst transmission is offset in time by the time offset;

determining a Doppler frequency from a relative velocity without receiving a communication from the intended receiver; and offsetting a synthesizer frequency by the Doppler frequency such that the burst transmission is offset in frequency by the Doppler frequency.

11. The method of claim 10 wherein:

the burst transmission is scheduled for a future time;

determining the time offset includes storing the time offset for use at the future time; and determining the Doppler frequency includes storing the Doppler frequency for use at the future time.

12. The method of claim 10 wherein the intended receiver is one of a plurality of satellites, and the method further comprises selecting the intended receiver from the plurality of satellites.

13. The method of claim 10 further comprising:

determining a modulation rate offset from the relative velocity; and configuring a timing generator to offset a modulation rate by the modulation rate offset.

14. In a system including multiple burst transmitters and at least one receiver moving relative to the multiple burst transmitters, a method of controlling received signal characteristics comprising:

providing each of the multiple burst transmitters with ephemeris data for the at least one receiver, the multiple burst transmitters being configured to propagate the ephemeris data and compute time offsets and frequency offsets without receiving a communication from the at least one receiver;

restricting guard times between expected burst transmissions; and restricting frequency guard bands between expected burst transmissions.

* * * * *